United States Patent [19]

LaRue, Jr.

[11] 4,190,353
[45] Feb. 26, 1980

[54] OPTICAL SYSTEM FOR ROTARY CAMERA

[75] Inventor: Mervin W. LaRue, Jr., Barrington, Ill.

[73] Assignee: Bell & Howell Company, Chicago, Ill.

[21] Appl. No.: 955,666

[22] Filed: Oct. 27, 1978

[51] Int. Cl.² ............................................. G03B 27/32
[52] U.S. Cl. ...................................................... 355/24
[58] Field of Search ...................... 355/23, 24, 51, 66, 355/64, 65

[56] References Cited

U.S. PATENT DOCUMENTS

| | | | |
|---|---|---|---|
| 2,984,150 | 5/1961 | Osgood | 355/24 |
| 3,885,871 | 5/1975 | Galatha et al. | 355/23 |
| 3,970,385 | 7/1976 | Kearney et al. | 355/64 X |

Primary Examiner—Donald A. Griffin
Attorney, Agent, or Firm—Alan B. Samlan

[57] ABSTRACT

A flow, or rotary type, microfilm recording apparatus for filming documents having a document transport means to move documents past an aperture area. A combining mirror, camera mirror, side mirror and camera lens are all mounted in a common plane. The plane of the mirrors is essentially perpendicular to the plane of the document as it passes through the filming aperture area. Either or both sides of the document can be film simultaneously. The possibility of having multiple reflected images on the film is eliminated by tilting one of the mirrors.

20 Claims, 8 Drawing Figures

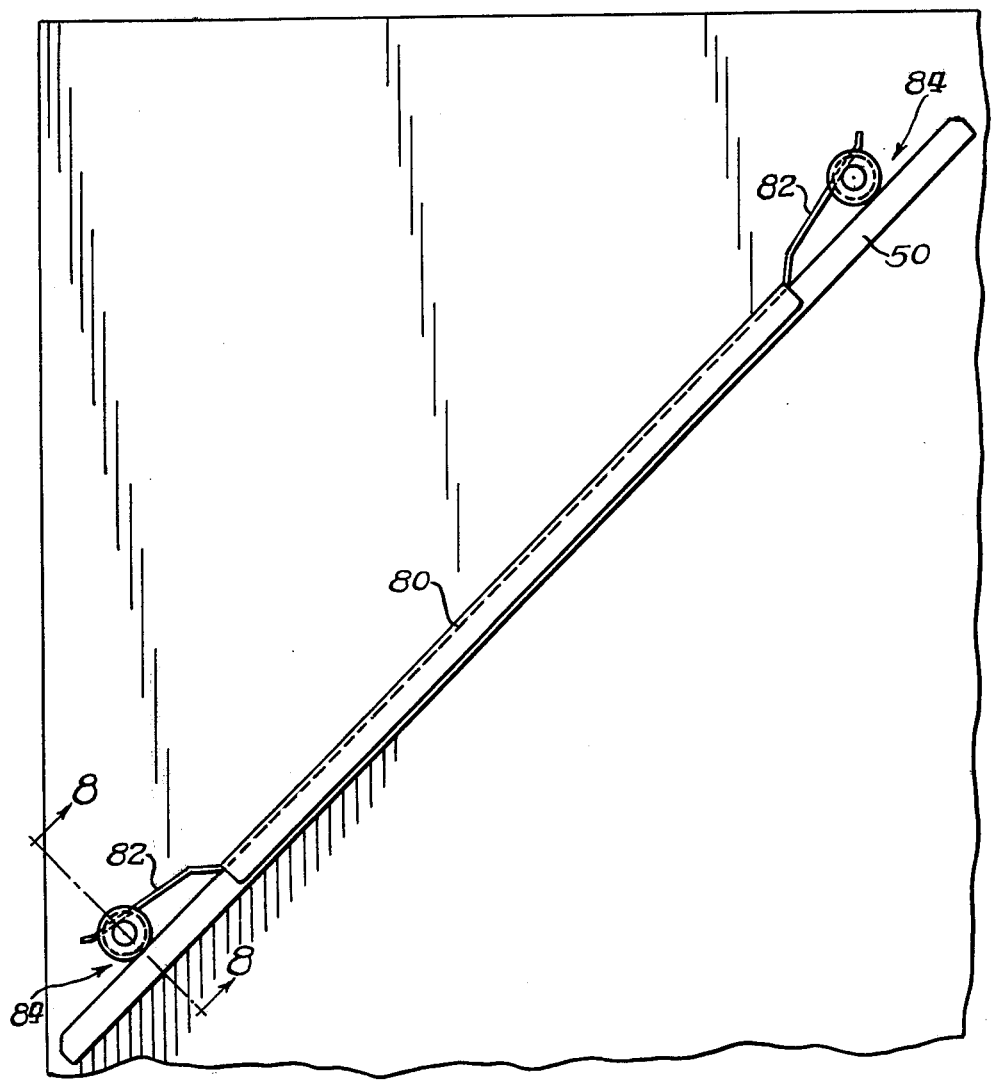
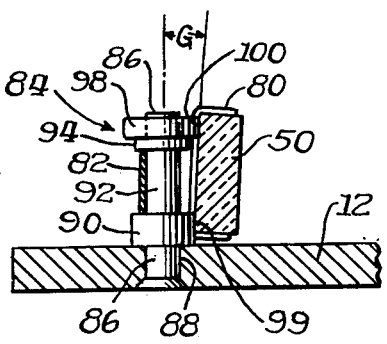

OPTICAL SYSTEM FOR ROTARY CAMERA

BACKGROUND OF THE INVENTION

This invention relates to apparatus for optically recording the images of documents, in greatly reduced size, upon film while those documents are continuously being transported past an aperture area. Mirrors are used in the apparatus to keep it to a convenient size and shape as well as to allow both sides of the original documents to be recorded simultaneously.

A fast and automatic method of accomplishing such recording is made possible by the use of a flow, or rotary, type of recorder. The documents to be photographed are caused to enter a feed area by manual or automatic means, following which the apparatus moves them at essentially constant velocity through the photographic area and into a stacking hopper. As each document moves through the recorder, it trips a control switch which starts the film moving and opens the camera shutter. As the document passes through the aperture, or photographic area, the image of the document is reflected by a series of mirrors through the camera lens and onto the film which is moving at a speed proportional to the speed of the document. Since the movement of film and document is so proportioned, the image of the document is stationary, or essentially so, on the surface of the recording medium even though the image and film are both in motion.

It is often desirable to microfilm both sides of certain documents. For example, financial institutions such as banks desire to microfilm both sides of checks showing all endorsements, and find it convenient to have the front and back sides of each check adjacent each other for ease of retrieval and viewing. In order to accomplish this, the image of both sides of the document must be reflected by mirrors onto the microfilm adjacent each other. Furthermore, it is desirable to record at high document velocities since the volume of documents processed can be great.

Previously, rotary microfilm recorders used varying numbers of mirrors normally reflecting the image of the document in two or more planes. Two sided document recorders required more than two mirrors projecting the image in two or more planes. One example is the SRM Recorder manufactured by Bell & Howell Company which utilizes six mirrors projecting the document image in four planes. One reason for the use of mirrors is to cause the microfilm recorder to be compact and occupy a minimum amount of space. By folding the light path through the use of mirrors, the total length of the light path can exceed many times the length of the recorder itself.

It is desirable to utilize as few mirrors as possible, while conserving size and bulk, since each mirror requires time consuming and costly alignment and adjustment. One can appreciate that a slight misadjustment of any one mirror can move the document image out of alignment with the camera The greater the number of mirrors, the greater is the possibility of misalignment and the more difficult it becomes to properly realign the system. This results in increased manufacturing costs and service calls at the operating location. Also, the intensity of the document image is reduced somewhat each time it is reflected. This causes a need to use brighter, less economical lamps for document illumination, and increases the possibility of causing extraneous light to expose the film falsely.

SUMMARY OF THE INVENTION

It is an object of this invention to provide a microfilm recording apparatus of the above-described type which uses a minimum number of mirrors to reflect the image of the document to the microfilm camera. It is a further object to utilize one of the mirrors to reflect the document image twice.

It is a further object to minimize the number of mirror adjustments to keep the optical system in alignment. A related object is to preset the mirrors during manufacturing so that the alignment is proper and fixed and not easily subject to dislocation in use.

Yet another object is to provide a microfilm recorder in which all mirrors in the system are in the same plane with the camera. This results in easier alignment of the optical system and the possibility of mounting all mirrors on a common base plate.

Still another object is to eliminate the possibility of multiple reflected images on the microfilm when filming documents which do not completely fill the photographic aperture.

These and other objects are realized and the problems and limitations of the prior art devices are overcome in this invention. The applicant's microfilm recording apparatus utilizes a document transport means which moves the document from a feed tray past an aperture area and into a stacking hopper. The document is illuminated in the aperture area by means of lamps. The mirrors are mounted on a common plane such that the portion of the document in the aperture area will have its image reflected by these mirrors.

The microfilm recording apparatus is applicable to single or double side photography. The recorder has there mirrors: a camera mirror, a side mirror, and a combining mirror. The camera and side mirrors are each at approximately 45° to the document face as it passes through the aperture and the combining mirror is perpendicular to the document. The image from one side of the document is reflected from the camera mirror to the combining mirror, back upon the camera mirror, and reflected through the lens of the camera. The image from the other side of the document is reflected from the side mirror to the combining mirror back to the camera mirror and then through the lens of the camera. In single side document photographing only one of the optical paths is utilized.

The optical path from the camera mirror to the lens of the camera passes through an opening between the camera mirror and the side mirror. This enables all of the mirrors to be in the same plane as the camera.

If small documents, such as checks, are photographed, there is the possibility of multiple images appearing on the film due to multiple reflections of the document image. In order to overcome this problem, one of the mirrors is angled slightly relative to the common plane, causing the multiple images to be moved out of the film recording area.

BRIEF DESCRIPTION OF THE DRAWINGS

FIG. 7 is a top plan view with portions removed of one of the mirrors of the present invention.

FIG. 8 is a cross-sectional view with portions removed taken along line 8—8 of FIG. 7 illustrating one method of tilting a mirror.

DESCRIPTION OF THE PREFERRED EMBODIMENT

Figure 1:
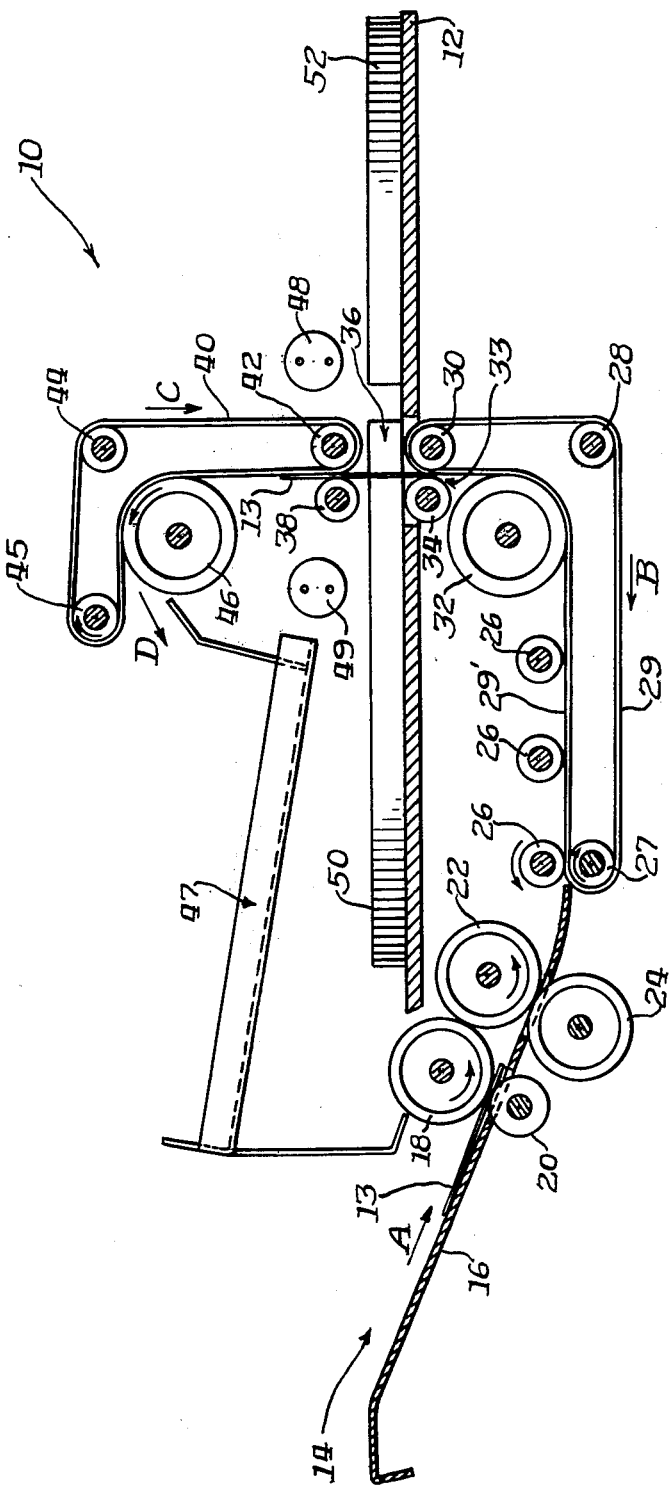
FIG. 1 is a side-view showing one form of document transport system in a flow or rotary type microfilm recorder.

Turning first to FIG. 1, the document transport of the inventive microfilm recorder 10 is illustrated. One or more documents 13 are placed in a document feed area 14. Generally, they rest on a feed tray 16 which is sloped downward so that the documents are automatically fed in the direction of arrow A by gravity toward a pull-in roller 18 and idler roller 20. A feed roller 22 and reverse driven roller 24 aid in insuring that only a single document is fed at a time. Examples of sheet feeding devices utilizing this concept are illustrated in U.S. Pat. Nos. 3,044,770 to Breuers and 3,885,782 to Write et al.

A first lower belt roller 27 has a lower feed belt 29 wrapped around it. Idle rollers 26 are positioned above a horizontal portion 29' of a lower feed belt 29 to hold the document against the lower feed belt 29. The lower feed belt portion 29' moves from its horizontal plane up vertically around lower drive roller 30 and back down around a second lower belt roller 28. A large roller 32 assists in making a gradual transition in the belt from a horizontal to a vertical orientation. The lower drive rollers 30 provides the power and driving means to move the belt in the direction indicated by arrow B. A lower nip is formed between a lower nip roller 34 and the belt 29 around the lower drive roller 30. Thus, a single document 13 is fed from the feed tray 16 past the pull-in and feed rollers 18, 20, along a horizontal portion 29' on the belt 29, transferred to a vertical path by means of the large roller 32 and then grabbed in the lower nip 33 with the lower feed belt 29 still driving the document upward in a vertical direction. The document 13 passes through an aperture area 36 and is then grabbed in an upper nip 37 defined by an upper nip roller 38 and upper feed belt 40 wrapped around a first upper belt roller 42. The aperture area 36 defined at its lower portion by a horizontal base structure 12 on which is mounted the system's mirror configuration which will be discussed later.

The upper feed belt 40 is wrapped around the first upper belt roller 42, a second upper belt roller 44, and an upper drive roller 45. The upper drive roller 45 drives the upper feed belt 40 in the direction of arrow C from the upper drive roller 45 horizontally to the second upper belt roller 44, then vertically down to the upper belt roller 42 and therearound, returning to the upper drive roller 45. A large roller 46 causes the belt to change direction from a vertical to a horizontal plane. Thus, the document 13 changes its direction of travel from its vertical orientation between the upper nip roller 38 and belt 40, to a horizontal direction between the large roller 46 and belt 40 passing around the upper drive roller 45. The documents are discharged into a stacking hopper 47 in the direction of arrow D. Thus, the document follows a path from a horizontal feed to a vertical flow past an aperture area, followed by a change back to a horizontal orientation for discharge into a collection area. For operator convenience, the discharge area is on the same side of the machine as the feed area.

The microfilm recorder is normally enclosed in a housing to protect the document transport system, to keep extraneous light from the camera, and to keep unwanted foreign articles from interfering with the document image in the aperture area. Thus, lamps 48 and 49 are supplied to illuminate the documents while in the aperture area. Two 15 watt fluorescent lamps have been found to be satisfactory in providing sufficient illumination for filming the documents.

Figure 2:
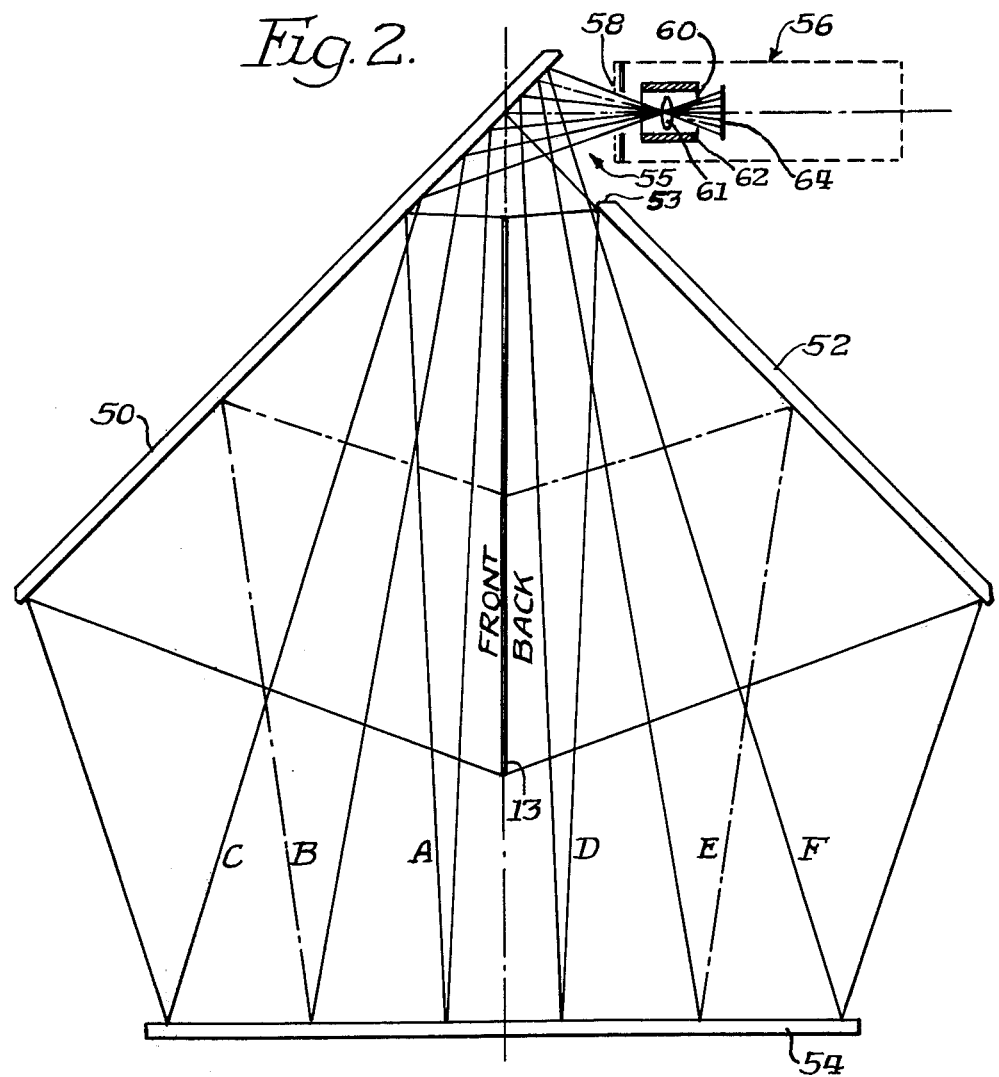
FIG. 2 is a top plan view of the optical system of the present invention.

Generally, as the document approaches the lower nip 33 it trips a switch (not illustrated) which starts the film in the camera moving. As the document leaves the aperture area, the switch is no longer held open and the camera shutter is closed and the film stopped. The film is moved at a speed proportional to the document speed and in a direction opposite the document movement which provides the apparent effect that both the film and document are essentially stationary in relation to each other. The principle of having the film moving only as the document is in the aperture area provides maximum film utilization since the film is advancing only during the time documents are being photographed. FIG. 2 is a top view which illustrates the novel optical system. The document 13 is shown having a front and back portion and in this figure is seen as only being an edge view thereof as the document is in the vertical portion of its travel when photographed. A camera mirror 50, side mirror 52, and combining mirror 54 are all mounted on the horizontal base structure 12. Thus, all the mirrors are mounted on a common plane.

The optical path of the front of the document 13 can easily be followed by viewing projection rays A, B, and C. The image from the front of document 13 first strikes the camera mirror 50 and is reflected to the combining mirror 54. The image is then reflected back upon the camera mirror 50, through passage 55 and into the camera 56.

The image from the back of document 13 is first reflected from the side mirror 52, to the combining mirror 54, to the camera mirror 50, and then through passage 55 and into the camera 56.

The camera 56 has a camera aperture 58, a shutter 60, lens 61, a lens adjusting means 62, and film 64. There is also a film transport means and automatic shutter control means (neither illustrated but commercially available) which are activated by the document as it passes through the aperture area 36.

The optical axis of the lens 61 is in the same plane as the mirrors. Thus, the passage 55, which is defined as the space between the camera mirror 50 and an edge 53 of the side mirror 52, is very important. The intention of applicant's system is to have the mirrors, lens and film all nominally in the same plane. This minimizes adjustments and make the manufacturing of the device much simpler.

Furthermore, applicant utilizes the camera mirror 50 twice. First, it reflects the front image from the document to the combining mirror 54 and second, it reflects the image from the combining mirror 54 into the camera 56. The camera mirror 50 is also used to reflect the back document image received from the combining mirror 54 into the camera 56.

Generally, the camera mirror 54 and side mirror 52 are each at a 45° angle to the plane of the document 13 as it is moving vertically through the aperture 36. The combining mirror 54 is perpendicular to the plane of the document 13 as it is passing through the aperture 36. These angles may be varied and still result in an operative system.

Figure 3:
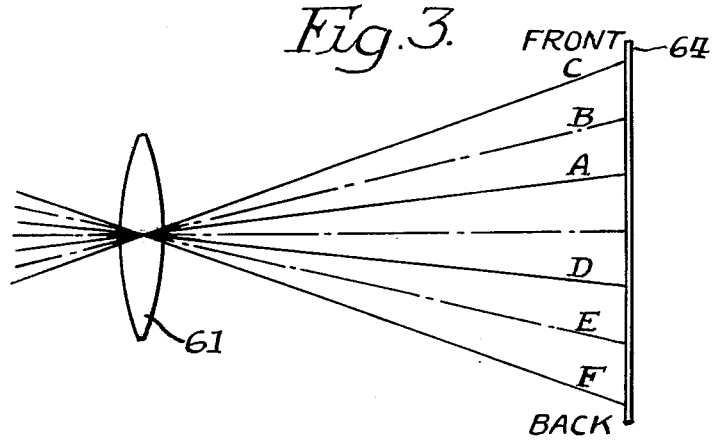
FIG. 3 is an enlarged view of the lens and film portion of the optical system shown in FIG. 2.

FIG. 3 is an enlargement of the lens and film shown schematically in FIG. 2. and clearly illustrates the front and back portions of the document 13 being photographed on the film 64 in a side by side relationship. In this manner, both the front and rear portions of a check or other document can be filmed simultaneously adjacent each other.

Figure 4:
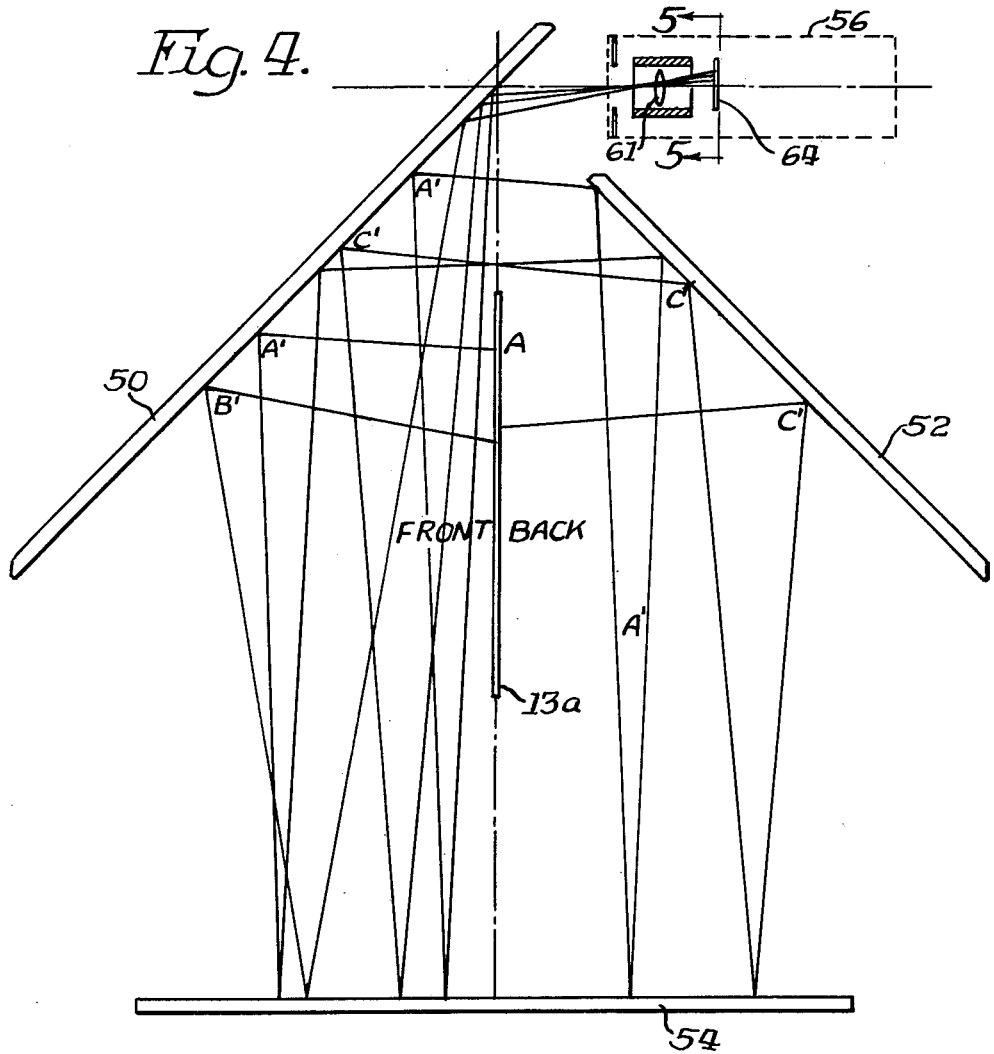
FIG. 4 is a top plan view of the optical system as illustrated in FIG. 2 showing the image light path of a small document which creates multiple reflected images.

FIG. 4 illustrates how multiple reflected images may occur on the microfilm. This multiple image effect is familiar to anyone who has sat in a room, such as a barbershop, which has mirrors on two opposite and almost parallel mirrored walls. When a person looks into one mirror, he can see the back of his head reflected from the opposite mirror. Likewise, he will see another reflection of his face, then the back of his head, then his face, continually growing smaller ad infinitum.

FIG. 4 illustrates this effect when microfilming document 13a, which as seen from a top view, has a height less than the height of document 13 in FIG. 2. Document 13a could be representative of a check. Tracing the optical path from one point on the document, A, the image is first reflected from camera mirror 50 to the combining mirror 54. It then reflects back upon itself and strikes the camera mirror 50 again before being reflected to the side mirror 52. The image is then reflected to the combining mirror 54, back upon itself striking the side mirror 52, then reflected to the camera mirror 50, to the combining mirror 54 striking it a third time, back to the camera mirror 50 and finally, into the camera. It must be recognized that this image will not be placed on the film in the same position as the image of the front of the document following the optical path in FIG. 2.

Figure 5:
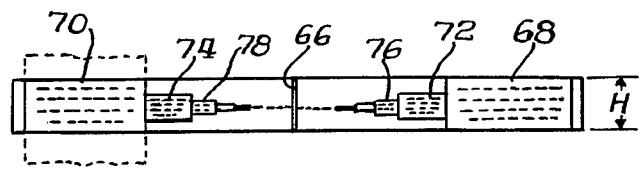
FIG. 5 illustrates the images seen by the microfilm of the document as it passes through the aperture taken along line 5—5 of FIG. 4.

What the film actually sees as a document passes through the aperture 36 is illustrated in FIG. 5. The height of the aperture area and mirrors proportionately reduced through the optical system is shown in FIG. 5 as H. The edge of the document is shown as 66. The image of the front of the document which follows the optical path of FIG. 2, is indicated as 68. An image from the back of the document is illustrated as 70. An optical path C from the back of the document results in a first multiple back image 72 adjacent the front image 68. Optical path A mentioned above, results in a first multiple front image 74 adjacent the image of the back of the document 70. A second multiple front image 76 and second multiple back image 78 occur adjacent first multiple images 72, and 74 respectively. These multiple images grow successively smaller ad infinitum approaching the document edge 66. It should be noted that the images 68-78 in FIG. 5 are not the images of the complet document only that portion of the document in the aperture area at a given instant. As the document moves through the aperture 36, the film moves synchronously in the opposite direction thereby filming the whole document.

In actual testing, it was found that only first multiple images 72 and 74 were detected on the film and were visible as foggy images. Subsequent multiple images were not present on the film, although present. An explanation is that the intensity of the image drops with each subsequent reflection, thereby becoming increasingly difficult for the film to photograph these faint images.

The multiple imaging effect is corrected by tilting the plane of the reflective surface of any of the mirrors a slight amount relative to the plane of the horizontal base structure 12. The mirrors are held in place by a mirror bracket 80 (FIGS. 7 and 8). The mirror bracket 80 is adhered to the mirror with a suitable adhesive and retains spring clips 82 at each end of the mirror bracket 80. Preferably front reflective mirrors are used, and bracket 80 is thus adhered to the non functional surface of the mirror. These spring clips 82 are expanded around a mirror support 84 at each end of the mirror 50. The compressive force of the spring clip 82 attempting to return to its original position anchors the mirror 50 into a rigid fixed position.

One method of tilting the mirrors is clearly illustrated in FIG. 8. The mirror support 84 is accurately positioned in the horizontal base structure 12 by means of a central core 86, received in a positioning hole 88 drilled perpendicular to the horizontal base structure 12. The core 86 has a bottom collar 90 and top collar 94, both securely fastened to the central core 86 or integrally formed therewith. A clip area 92 is defined between the bottom collar 90 and top collar 94 on the core 86. The height of the clip area 92 is slightly greater than the height of the spring clip 82 and provides an area against which the spring clip 82 can exert its spring compressive force. The bottom collar 90 rests on the base structure 12 and provides structural support for the mirror support 84. The top collar 94 has a flat top surface and has a diameter equal to that of the diameter of the bottom collar 90. A ring 98 has a central opening closely received by the top of the core 86. The clip 82 pulls the mirror 50 such that it contacts the mirror support 84 at two points. One point, 99, is at the base of the mirror 50 and bottom collar 90, and a second point, 100, is at the top of the mirror 50 and ring 98. If the diameter of ring 98 and collar 90 were the same, the mirror 50 would be parallel to the core 86 and perpendicular to horizontal base structure 12. However, the diamtere of the ring 98 was made approximately 0.003 inches larger than the diameter of the bottom collar 90. With the height of the mirror 50 approximately 0.5 inches, the angle G was approximately 0.33 degrees. This was found to be a sufficient tilt of the camera mirror 50 to result in elimination of the multiple images shown in FIG. 5. Mirrors 50, 52 and 54 are anchored in this manner although all the mirrors were not tilted. It should be noted that accurate alignment of the mirrors relative to the document can be achieved by accurate positioning of holes 88 in the base structure 12.

Figure 6:
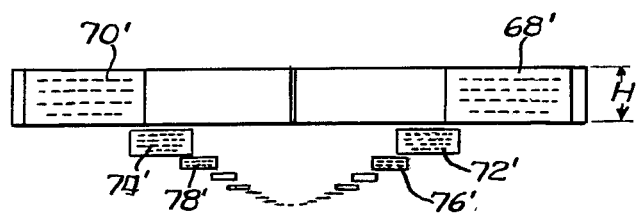
FIG. 6 illustrates the images of the document in FIG. 4 seen by the microfilm after correcting for any multiple reflected images.

FIG. 6 illustrates the effect of tilting a mirror as shown in FIG. 8. The aperture area as seen by the film is still shown as H. The image of the front and back portions of the document are shown by 68 and 70 respectively. However, the first multiple back image 72' although still present, is not seen by the film. Rather, it is dropped down below the aperture area H, and not photographed on the film. Similarly, multiple front image 74' is dropped below the aperture area. Second multiple images 76' and 78' along with all other multiple images, become progressively smaller and further from the filmed area.

It was found that the most desirable mirror to tilt was the combining mirror 54. It should also be realized that the tilt of the mirrors can be in the upward direction rather than the downward direction as illustrated in FIG. 8.

It should also be realized that the base structure 12 could be placed in other than a horizontal position and the document transport be oriented to cause documents to flow through the aperture area 36 in other than a vertical mode. The intent is to have the document portion in the aperture area substantially perpendicular to the base structure.

Thus, it is seen that there has been provided a novel optical system for flow or rotary type microfilm recorders. The mirrors are placed in a common plane with the lens in the camera. The resulting benefits are ease of manufacturing and alignment of the mirrors as the image of the document to be recorded is kept in a single plane. The possibility of multiple reflected image is eliminated by tilting one of the mirrors relative to the common mirror plane.

Thus, it is apparent that there has been provided, in accordance with the invention, an optical system for a rotary or flow type camera that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A microfilm recording apparatus for filming documents comprising:
   (a) a camera having a lens with an optical axis, and film,
   (b) a base structure,
   (c) document transport means to move the documents past an aperture area such that the plane of the document portion in the aperture area is substantially perpendicular to the base structure
   (d) a combining mirror mounted to the base plate substantially perpendicular to the plane of the document portion in the aperture area
   (e) a camera mirror mounted to the base structure on one side of and at an acute angle to the document plane in the aperture area and at an acute angle to the combining mirror, and
   (f) each of the mirrors having a reflective surface, whereby a folded optical path lying substantially in one plane is formed from a point on the document in the aperture area to the film via the camera mirror, combining mirror, back to the camera mirror and through the lens.

2. The apparatus of claim 1 wherein the base structure is substantially horizontal and the plane of the document portion in the aperture area is substantially vertical.

3. The apparatus of claim 1 or 2 and further comprising:
   (g) a side mirror mounted to the base structure on the side of the document plane opposite the camera mirror at an acute angle to the document plane and the combining mirror,
   (h) whereby a second folded optical path lying substantially in one plane is formed from a point on the opposite side of the document in the aperture area to the film via the side mirror, combining mirror, back to the camera mirror, and into the camera lens.

4. The device of claim 3 and further comprising: illuminating means to illuminate the portion of the document in the aperture area.

5. The device of claim 4 and further comprising: a film transport system such that the film moves in a direction opposite the direction of the document moving in the aperture area.

6. The device of claim 5 wherein the film moves at a speed proportioned to the document's speed to provide the apparent effect that both are stationary with respect to each other.

7. The device of claim 1 wherein the aperture area is the area between the base structure and a pair of rollers forming a nip.

8. The device of claim 1, 2 or 3, wherein the reflective surface of one or more of the mirrors is placed at an angle other than 90° relative to the base structure.

9. The device of claim 3 wherein the folded optical path of the point on the document passes through an opening between the camera mirror and side mirror.

10. A mirofilm recording apparatus for filming documents comprising:
    (a) a camera having film, a film transport system and a lens with an optical axis;
    (b) a combining mirror parallel to and displaced from the optical axis;
    (c) an aperture area past which the documents are transported, the aperture area located between the combining mirror and optical axis;
    (d) means to transport the documents past the aperture area;
    (e) the plane of the document in the aperture area being perpendicular to the optical axis and the optical axis displaced from the document such that the document does not cross the optical axis while in the aperture area; and
    (f) a camera mirror mounted at an acute angle to the combining mirror and to the plane of the document in the aperture area whereby an optical path of the image of the side of the document to be filmed is formed by light from the document passing from the aperture area to the camera mirror, reflected to the combining mirror, back to the camera mirror, through the lens, and incident upon the film in the camera.

11. The apparatus of claim 10 further comprising:
    (g) a side mirror mounted at an acute angle to the combining mirror and to the plane of the document in the aperture area and on the side of the document opposite the camera mirror;
    (h) whereby an optical path of the image of the opposite side of the document to be filmed is formed by light from the document passing from the aperture area to the side mirror, reflected to the combining mirror, back to the camera mirror, through the lens and incident upon the film in the camera.

12. The device of claim 10 or 11 wherein the optical path of the image lies substantially in one plane.

13. The device of claim 11 wherein the combining mirror, camera mirror and side mirror are mounted on a common base structure.

14. The device of claim 13 wherein the aperture area is the area between the base structure and a pair of rollers forming a nip.

15. The device of claim 13 wherein the reflective surface of one or more of the mirrors is placed at an angle other than 90° relative to the base structure.

16. The device of claim 10 or 11 and further comprising:
    illuminating means to illuminate the portion of the document in the aperture area.

17. The device of claim 11 wherein the camera mirror, combining mirror, and side mirror are mounted on a substantially horizontal plane and the plane of the document in the aperture area is in a substantially vertical plane.

18. The device of claim 10 or 11 and further comprising:
    a film transport system such that the film moves in a direction opposite the direction of the document moving in the aperture area.

19. The device of claim 18 wherein the film moves at a speed proportioned to the document's speed to provide the apparent effect that both are stationary with respect to each other.

20. The device of claim 11 wherein the folded optical path of the document image passes through an opening between the camera mirror and side mirror.

* * * * *

UNITED STATES PATENT AND TRADEMARK OFFICE
CERTIFICATE OF CORRECTION

PATENT NO. : 4,190,353
DATED : February 26, 1980
INVENTOR(S) : Mervin W. LaRue, Jr.

It is certified that error appears in the above-identified patent and that said Letters Patent are hereby corrected as shown below:

In column 2, line 38 "there" should be --three--.

In column 5, line 64, "complet" should be --complete--.

In column 6, line 47, "diamtere" should be --diameter--.

In column 7, line 21, "image" should be --images--.

In column 7, line 46, (Claim 1, line 10), "plate" should be --structure--.

Signed and Sealed this

Tenth Day of June 1980

[SEAL]

Attest:

SIDNEY A. DIAMOND

Attesting Officer

Commissioner of Patents and Trademarks